United States Patent
Moiyallah, Jr. et al.

(10) Patent No.: US 11,423,396 B2
(45) Date of Patent: Aug. 23, 2022

(54) REUSABLE NEAR FIELD COMMUNICATION ("NFC") DEVICE FOR PRE-STAGE POINT-OF-SALE ("POS") PAYMENTS

(71) Applicant: Bank of America Corporation, Charlotte, NC (US)

(72) Inventors: Samuel M. Moiyallah, Jr., Newark, DE (US); Julio A. Vancini, Plano, TX (US); Susan Moss, Vestal, NY (US); Joseph Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 239 days.

(21) Appl. No.: 16/699,685

(22) Filed: Dec. 1, 2019

(65) Prior Publication Data
US 2021/0166218 A1 Jun. 3, 2021

(51) Int. Cl.
*G06Q 20/38* (2012.01)
*G06Q 20/36* (2012.01)
*H04W 80/02* (2009.01)
*G06Q 20/32* (2012.01)
*H04B 5/00* (2006.01)
*G06Q 20/20* (2012.01)

(52) U.S. Cl.
CPC ....... *G06Q 20/3674* (2013.01); *G06Q 20/204* (2013.01); *G06Q 20/3278* (2013.01); *G06Q 20/363* (2013.01); *H04B 5/0031* (2013.01); *H04W 80/02* (2013.01)

(58) Field of Classification Search
CPC .................................................. G06Q 20/3674
USPC ........................................................... 705/67
See application file for complete search history.

(56) References Cited

U.S. PATENT DOCUMENTS

2013/0311313 A1  11/2013  Laracey
2014/0019276 A1* 1/2014  Rifaat ............... G06Q 20/3574
                                                          705/21

(Continued)

FOREIGN PATENT DOCUMENTS

WO     WO2014/092266     6/2014

OTHER PUBLICATIONS

Van Renesse et al., "Efficient Reconciliation and Flow Control for Anti-Entropy Protocols," http://www.cs.cornell.edu/home.rvr/papers/flowgossip.pdf, Retrieved on Oct. 29, 2019.

(Continued)

*Primary Examiner* — Chinedu C Agwumezie
(74) *Attorney, Agent, or Firm* — Weiss & Arons LLP

(57) ABSTRACT

As the world progresses towards a 100% cashless payment society, there has been a rise in the various forms of emerging payment technologies. Such technologies may include digital wallet payment applications. There is a need for a plug and play, universal protocol that would bridge the gap between these various emerging payment technologies and their respective proprietary ecosystems. The plug and play universal protocol would be deployed in each money transfer ecosystem and would be responsible for forwarding money to an account/wallet external to the ecosystem. There is also a need for a hardware digital wallet that interacts with the bridging protocol, merchant POS terminals and other transaction processing systems.

6 Claims, 9 Drawing Sheets

(56) References Cited

U.S. PATENT DOCUMENTS

| | | |
|---|---|---|
| 2015/0206135 A1 | 7/2015 | Scipioni et al. |
| 2016/0283759 A1 | 9/2016 | Forster |
| 2016/0379206 A1* | 12/2016 | Lee .................. G06Q 20/3229 705/40 |
| 2018/0268382 A1* | 9/2018 | Wasserman .......... G06Q 20/223 |
| 2018/0330342 A1* | 11/2018 | Prakash ........... G06Q 20/38215 |

OTHER PUBLICATIONS

Subramaniyan et al., "GEMS: Gossip-Enabled Monitoring Service for Scalable Heterogeneous Distributed Systems," https://link.springer.com/article/10.1007%2Fs10586-006-4900-5, Springer Science + Business Media, Inc., Jan. 2006.

"Using Gossip Protocols for Failure Detection, Monitoring, Messaging and Other Good Things." http://highscalability.com/blog/2011/11/14/using-gossip-protocols-for-failure-detection-monitoring-mess.html, Nov. 14, 2011.

"Gossip Protocol: An Introduction," https://nufailm.blogspot.com/2012/02/gossip-protocol-introduction.html, Nuf Said, Feb. 8, 2012.

Jannotti et al., "Overcast: Reliable Multicasting with an Overlay Network," http://cs.brown.eda/~jj/papers/overcast-osdi00.pdf Cisco Systems, Oct. 2000.

"Overlay Network," https://en.wikipedia.org/wiki/Overlay_network, Wikimedia Foundation, Inc., Oct. 14, 2019.

"Gossip Protocol," https://en.wikipedia.org/wiki/Gossip_protocol, Wikimedia Foundation, Inc., Oct. 8, 2019.

Braginsky et al., "Rumor Routing Algorithm for Sensor Networks," http://pascalfroissart.online.fr/3-cache/2002-braginsky-estrin.pdf Computer Science Department UCLA, 2002.

* cited by examiner

700 → 701

Record 1: Transfer of $10 by DWA₁ to DWA₃

SourceName(Cust #1)
Receiver(Cust #2)
Amount ($10)
DestinationWalletID(12345)
CurrencyGenesisSerialnumber(2345-hash)
OriginWallet(SDW1) | Origin WalletID(12345)
Genesis date (MM/DD/YY)
Transaction Date (MM/DD/YY)
transaction_ID (xxxxxx)

703

Record 2: Transfer of $20 by DWA₂ to DWA₃

SourceName(Cust #3)
Receiver (Cust #2)
Amount ($20)
DestinationWalletID(12345)
MoneyGenesisSerialnumber(8765-hash)
OriginWallet(SDW2) | Origin WalletID(54321)
Genesis date (MM/DD/YYYY)
transaction Date (MM/DD/YYYY)
transaction ID (yyyyyy)

705

Record 3: Transfer of $5 by DWA₃ to DWA₄

SourceName(Cust #2)
Receiver (Cust #4)
Amount ($5)
DestinationWalletID(67891)
MoneyGenesisSerialnumber(2345-hash)
OriginWallet(SDW1) | Origin WalletID(12345)

FIG. 7A

```
Genesis date (MM/DD/YYYY)
transaction Date (MM/DD/YYYY)
transaction_ID (aaaaaa)
```
⟶ 705

Record 4: Transfer of $25 from $DWA_3$ to $DWA_5$

⟵ 707

*Record 4a:* Transfer of $5 from $DWA_3$ to $DWA_5$

*SourceName(Cust #2)*
*Receiver (Cust #5)*
*Amount ($5)*
*DestinationWalletID(55432)*
*MoneyGenesisSerialnumber(2345-hash)*
*OriginWallet(SDW1) | Origin WalletID(12345)*
*Genesis date (MM/DD/YYYY)*
*Transaction Date (MM/DD/YYYY)*
*transaction_ID (cccccc)*

⟵ 709

*Record 4b:* Transfer of $20 from $DWA_3$ to $DWA_5$

*SourceName(Cust #2)*
*Receiver (Cust #5)*
*Amount ($20)*
*DesitnationWalletID(55432)*
*MoneyGenesisSerialnumber(8765-hash)*
*Originwallet(SDW2) | Origin WalletID(54321)*
*Genesis date (MM/DD/YYYY)*
*transaction Date (MM/DD/YYYY)*
*transaction_ID (vvvvvv)*

REUSABLE NEAR FIELD COMMUNICATION ("NFC") DEVICE FOR PRE-STAGE POINT-OF-SALE ("POS") PAYMENTS

FIELD OF TECHNOLOGY

This application describes apparatus and methods for digital payment processing technology.

BACKGROUND

As the world progresses towards a cashless payment society, there has been a rise in the various forms of emerging payment technologies. Such technologies may include digital wallet payment applications.

Many different digital payment applications are now available in the marketplace. However, each digital payment application typically uses its own proprietary technology, communication protocols, data structures and encryption.

There is a need for a hardware device that would bridge the gap between these various payment technologies and their respective proprietary ecosystems. Specifically, it would be desirable to provide a hardware device that is configured to seamlessly interact with multiple proprietary payment ecosystems at a merchant POS terminal. Accordingly, it is desirable to provide apparatus and methods for a REUSABLE NFC DEVICE FOR PRE-STAGE POS PAYMENT.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 7A and 7B show illustrative information in accordance with principles of the disclosure;

DETAILED DESCRIPTION

Figure 1:
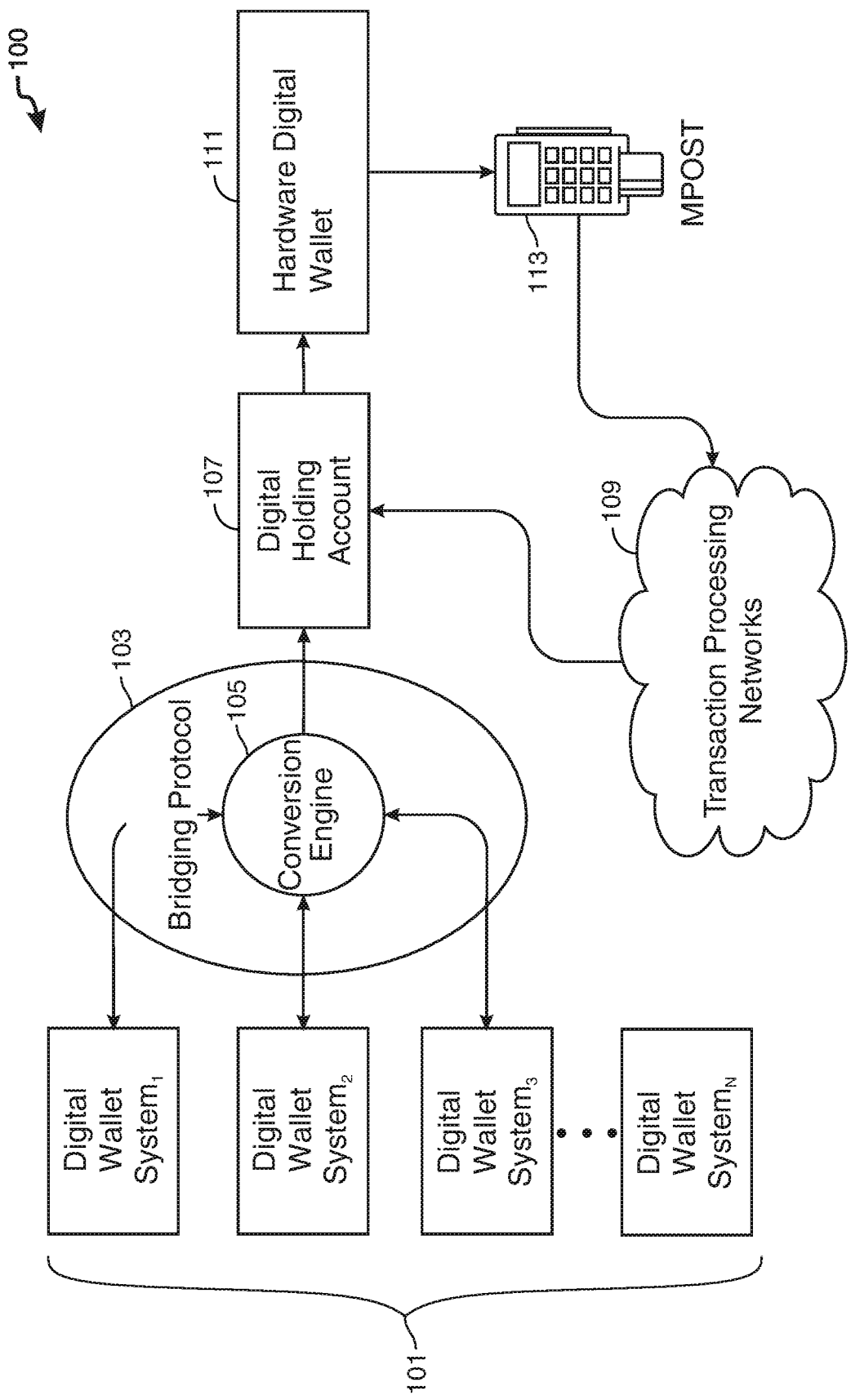
FIG. 1 shows an illustrative system in accordance with principles of the disclosure.

Apparatus for bridging between multiple digital wallet systems is provided. Apparatus may include a bridging protocol that orchestrates communication between otherwise incompatible digital wallet systems. The bridging protocol may include machine executable instructions running on a computing system. The executable instructions may be self-executing and trigger actions at specified times and/or based on reference to the occurrence or non-occurrence of a target action or event. Some or all of the computer executable instructions may be embodied in hardware or firmware components of a computing system.

The incompatible systems may be digital payment systems. Digital payment systems are typically configured to communicate between users of such systems. The users may run software and/or hardware (collectively, client equipment) that is compatible with the digital payment system.

Typically, a user operating client equipment compatible with one digital payment system is unable to transfer or receive currency from a user operating client equipment compatible with another digital payment system. Currency may include conventional currencies (e.g., USD, EUR, AUD, GBP, JPY, CAD). Currency may include cryptocurrencies (e.g., Bitcoin, Ethereum, Ripple, Bitcoin Cash, NEM, Litecoin, IOTA, NEO, Dash, Qtum, Monero and/or Dogecoin). A digital payment system may apply proprietary security requirements and formulate proprietary communications that are not understood by other digital payment systems and client equipment associated with those other digital payment systems.

The bridging protocol may receive a request. The request may be initiated by a source digital wallet system. The request may ask a digital wallet system to transfer currency to a destination digital wallet system. The source digital wallet system may operate using a first data or communication format. The first format may be proprietary. The destination digital wallet system may operate using a second data or communication format. The second format may be proprietary. The source digital wallet system may be unable to process information generated by the destination digital wallet system. The destination digital wallet system may be unable to process information generated by the source digital wallet system.

The bridging protocol may locate currency associated with the source digital wallet system. The currency may be identified in the transfer request. The currency may be associated with a digital wallet. A digital wallet may refer to electronic devices and programs used for making payments or purchases digitally, without presenting a physical credit card, debit card, or cash. A digital wallet may include an electronic device (e.g., smartphone) that stores payment information and the computer program (e.g., application) used to make the payment. A digital wallet may also hold other information, such as identity credentials, transportation tickets, event tickets, loyalty or gift credentials.

The bridging protocol may locate the currency via communication with a financial institution holding funds associated with the source digital wallet system. The bridging protocol may locate the currency via communication with a distributed ledger that maintains a record of funds associated with the source digital wallet system.

The bridging protocol may assign a unique identifier to the currency of the transfer request. The unique identifier may be an identifier that will be associated with the amount of currency as the currency moves from wallet to wallet within one or more digital payment systems. The bridging protocol may record the unique identifier in a distributed ledger. The bridging protocol may record attributes associated with a digital wallet or digital wallet system in the distributed ledger. Illustrative attributes may include the following:

Source Digital Wallet System
Recipient Digital Wallet System
Name of sender
Name of recipient Amount
Currency Origin Digital Wallet System
Currency Origin Wallet ID
Source Wallet ID
Destination Wallet ID
Unique Identifier
Unique Identifier Assignment Date
Current Transaction Date
Current Transaction ID
Source of Currency (e.g., Checking account, Cash deposit, paycheck, gift)
Institution holding source currency
Destination Institution
Identity of banking institution holding currency associated with a digital wallet (e.g., routing number)
Account Number at banking institution holding currency associated with a digital wallet The bridging protocol may validate a transactional integrity of the currency identified in the transfer request. Validating the transactional integrity may include generating a map of the flow of currency assigned the unique identifier. The map may include a flow of the currency from one digital payment system to another digital payment system. The map may include a flow between users of a single digital payment system.

Validating the transactional integrity may include determining an origin of the currency. The origin may be a record of the currency previously created by the bridging protocol. Validating the transactional integrity may include analysis of the map. The analysis may include determining whether the map includes repeating transfer patterns. Repeating transfer patterns may include currency transfers having common attributes.

For example, the mapping may show that the currency was included in multiple transfers that each involved a threshold number of common senders and recipients. Each transfer may utilize a different digital wallet system. Each transfer may be associated with currency earmarked for a particular use. Each transfer may be associated with a particular amount of currency. Each transfer may be associated with a particular geographic location.

The bridging protocol may be configured to validate the transactional integrity by identifying repeating transfer patterns in the mapping.

When the transactional integrity is above a threshold level (e.g., less than a threshold number of repeating transfer patterns), the bridging protocol may disseminate the transactional integrity to each digital payment system that participated in a transfer of the currency assigned the unique identifier. The bridging protocol may inform each digital wallet system for a given transaction is above the threshold level. The transactional integrity may be used to validate a source of currency. The transactional integrity may identify risk factors before accepting funds into a digital payment system. Such risk factors may include unusual or suspicious transfer patterns.

The bridging protocol may utilize a gossip communication bridging protocol to share the transaction integrity with other digital payment systems. A gossip communication bridging protocol may include a procedure or process of computer communication formulated based on the way epidemics spread. Such communication may include peer-to-peer communication without centralized control to ensure that the transactional integrity is received by each of the multiple digital payment systems.

When the transactional integrity is above a threshold level (e.g., less than a threshold number of repeating transfer patterns), the bridging protocol may initiate a transfer of the currency to the destination digital wallet system. The destination wallet system may utilize client equipment that is incompatible with the source digital wallet system. The bridging protocol may formulate data and communications that are compatible with the destination digital wallet system.

The bridging protocol may be configured to receive a transfer request from a first digital wallet system in first data format. The bridging protocol may be configured to transfer the currency to the destination digital wallet system in a second data format.

When the transactional integrity is below the threshold the bridging protocol may be configured to reject the transfer request. The transaction integrity may be below the threshold when the mapping of the currency flow includes a threshold number of repeating transfer patterns. The repeating transfer patterns may include multiple transfers that involve a target source digital wallet system and/or a specific user or device associated with the source digital wallet system. The repeating transfer patterns may include multiple transfers that involve a target destination digital wallet system and/or specific user or device associated with the destination digital wallet system.

The bridging protocol may disseminate a rejection of a transfer request to each digital currency system that transferred currency assigned the unique identifier. The bridging protocol may be configured to block future transactions that include currency having the unique identifier.

The bridging protocol may be further configured to locate a source account corresponding to the source digital wallet system. The source account may be located based on a geographic location associated with a source digital wallet. The source account may be located based on the unique identifier assigned to the currency. The source account may be located based on an identity of the sender of the currency. The sender may be a name or other identifying information assigned to the source digital wallet.

The bridging protocol may locate a destination account. The destination account may correspond to the destination digital wallet. The destination account may be located based on a location associated with the destination digital wallet. The destination account may be located based on the unique identifier assigned to currency. The destination account may be located based on an identity of the recipient of the currency. The destination may be a name or other identifying information assigned to the destination digital wallet.

The bridging protocol may debit the source account and credit the destination account. The credit and the debit may require access to currency transfer networks such as the Federal Reserve Wire Network ("Fedwire"), Clearing House Interbank Payments System ("CHIPS"), Society for Worldwide Interbank Financial Telecommunication ("SWIFT") and other suitable settlement networks known to those of skill in the art.

The bridging protocol may record the credit and debit in one or more distributed ledgers. The bridging protocol may be further configured to record the transactional integrity associated with a transfer in the distributed ledger. A distributed electronic ledger may store records in any suitable format. For example, records may be stored sequentially as they are generated, one after the other in a continuous ledger. Records may be stored in blocks, such as in a blockchain.

The distributed ledger may be a public or unpermissioned distributed ledger. A public distributed ledger does not have restriction on who may participate in the establishing a consensus for adding a new record. For example, records stored in a public distributed ledger may only be added to the ledger when systems that rely on the distributed ledger (e.g., digital payment system or systems responsible for maintaining the source or destination accounts) reach a consensus. The distributed ledger may use any suitable consensus algorithm such as Proof of Work, Proof of Stake or Practical Byzantine Fault Tolerance.

The distributed ledger may be a private or permissioned distributed ledger. A private distributed ledger may include restrictions on who may participate in the establishing a consensus for adding a new record.

The distributed ledger may utilize a combination of private and public participation to establish a consensus. For example, the distributed ledger may require a threshold number of private and/or public votes before recording a transaction on the distributed ledger. Utilization of private entities may allow for achieving a consensus (or rejection) of a transaction faster than wholly public distributed ledgers.

The distributed ledger may be a blockchain. Records stored in a blockchain are organized in blocks. Each block may include multiple records. The blocks are linked to one another and secured using cryptography.

The bridging protocol may record one or more attributes associated with a currency transfer in a distributed ledger. Illustrative attributes may include a type of currency (e.g., USD, EUR, AUD, GBP, JPY, CAD), an amount of currency, a source digital wallet system and the destination digital wallet system. A distributed ledger may link digital currency transactions based common attributes shared by the transactions. The common attributes may be used to generate a map depicting flow the currency. Common attributes may include the unique identifier assigned to currency. Common attributes may include parties (e.g. source, destination) associated with a digital currency transaction.

The bridging protocol may be configured to move the currency from the source account into a digital holding account. The currency may be moved into the holding account after the bridging protocol receives the request for transferring the currency. The digital holding account may hold the currency until the bridging protocol validates the transactional integrity.

After validating the transactional integrity, the bridging protocol may transfer the currency to a destination digital wallet system. If the transaction integrity is below the threshold, the bridging protocol may transfer the currency back to the source digital wallet system. The bridging protocol may be configured to reject future transactions that include currency transferred back to a source digital wallet system. The bridging protocol may identify such currency based on a unique identifier assigned to the currency. The bridging protocol may be configured to inform the multiple digital currency systems of the rejection. The bridging protocol may inform the multiple digital payment application of the rejection using a gossip communication bridging protocol.

A bridging protocol for bridging between multiple digital currency systems is provided. The bridging protocol may be configured to receive a request initiated by a source digital wallet system. The source digital wallet system may use a first proprietary communication or data format. The source digital wallet system may request a transfer of an amount of currency to a destination digital wallet system. The destination digital wallet system may use a second proprietary communication or data format. The first and second proprietary formats may be incompatible with each other.

The bridging protocol may be configured to validate a transactional integrity of the amount. The bridging protocol may be configured to validate the transactional integrity using a unique identifier assigned to the amount. The unique identifier may have been assigned to the amount by the bridging protocol in connection with a previous transaction.

When the transactional integrity is above a threshold, the bridging protocol may disseminate the transactional integrity to multiple digital currency systems. The transactional integrity may be circulated among the digital currency systems using a gossip-type communication protocol. The bridging protocol may circulate the transactional integrity to each digital currency system that has received currency included in the amount and assigned a common unique identifier.

The bridging protocol may formulate communications with the source digital wallet system in the first format. Using the first format, the bridging protocol may debit an account or digital wallet controlled by the source digital wallet system. Using the first format, the bridging protocol may transfer the amount from an account or digital wallet controlled by the source digital wallet system to a digital holding account. Access to the digital holding account may be controlled by the bridging protocol.

The bridging protocol may formulate a transfer of the amount held in the digital holding account in the second proprietary format used by the destination digital wallet system. The bridging protocol may formulate any communication with the destination digital wallet system in the second proprietary format. For example, using the second format, the bridging protocol may credit an account or digital wallet controlled by the destination digital wallet system. Using the second format, the bridging protocol may effectuate a transfer the amount from an account or digital wallet controlled by the source digital wallet system to the destination digital wallet system. The bridging protocol may effectuate the transfer via a digital holding account. The digital holding account may be controlled by the bridging protocol.

When a transactional integrity of the currency identified in a transfer request is below the threshold, the bridging protocol may be configured to reject the transfer request. In some embodiments, when the transactional integrity is below the threshold, the bridging protocol may quarantine currency identified in a transfer request and held in the digital holding account.

Validation of the transactional integrity may be performed by a smart contract running on a distributed ledger. A smart contract may include machine executable instructions running on a computing system. The executable instructions may be self-executing and trigger actions at specified times and/or based on reference to the occurrence or non-occurrence of a target action or event. Some or all of the computer executable instructions may be embodied in hardware or firmware components of a computing system.

The bridging protocol and associated smart contracts may be run in cloud computing environments that include virtual software implementations. Such virtual software implementations may be designed to run on a physical hardware supplied externally by a hosting provider, a client, or other platform. The bridging protocol and associated smart contracts may include computer executable instructions for invoking user functionality related to communication, such as email, short message service ("SMS"), and voice input and speech recognition applications.

The bridging protocol and associated smart contracts may utilize computer-executable instructions, such as program modules, executed by a processor on the computing system. Generally, program modules include routines, programs, objects, components, data structures, etc. that perform particular tasks or implement particular abstract data types. The bridging protocol and associated smart contracts may be operational with distributed computing environments where tasks are performed by remote processing devices that are linked through a communications network. In a distributed computing environment, program modules may be located in both local and remote computer storage media including memory storage devices. The bridging protocol and associated smart contracts may rely on a network of remote servers hosted on the Internet to store, manage, and process data (e.g., "cloud computing" and/or "fog computing"). For example, smart contracts may be run on nodes that form a blockchain environment.

The amount included in a transfer request may include currency associated with a first unique identifier. The amount included in the transfer request may include currency associated with a second unique identifier. The unique identifier may allow the currency to be traced back to an originating source. Each transfer request that includes the currency may be associated with the unique identifier. For example, a transaction record associated with each transaction may include the unique identifier. The transaction record may be recorded in a distributed ledger.

The bridging protocol may be configured to execute a first validation routine for a first amount of the currency. The bridging protocol may be configured to execute a second validation routine for the second amount of the currency.

A first amount of the currency may be associated with a first identifier and a first transactional integrity. A second amount of the currency may be associated with a second identifier and a second transactional integrity. The bridging protocol may validate a comprehensive transactional integrity for the transfer request (first and second amounts). The comprehensive transactional integrity may be based on the first validation routine applied to the first amount. The comprehensive transactional integrity may be based on the second validation routine applied to the second amount.

The transactional integrity for the first amount may be above the threshold. The transactional integrity for the second amount may be below the threshold. The transactional integrity for the first amount may be below the threshold. The transactional integrity for the second amount may be above the threshold. The transactional integrity for the first and second amounts may be above the threshold. The transactional integrity for the first and second amounts may be below the threshold.

The bridging protocol may be configured to transfer the first amount to the destination digital wallet system and reject the request to transfer the second amount. For example, the transaction integrity for the first amount may be above the threshold and the transactional integrity for the second amount may be below the threshold.

In some embodiments, when the transactional integrity associated with the first or second amounts is below the threshold, the bridging protocol may be configured to reject the transfer of the first and second amounts. The bridging protocol may be configured to propagate the rejection of a request to each of the multiple digital wallet systems. The bridging protocol may propagate the rejection to each of the multiple digital wallet systems in a proprietary format usable by each digital wallet system.

A transfer request may be a first request to transfer a first amount from a source digital wallet system to a destination digital wallet system. The bridging protocol may be configured to receive a second request. The second request may be initiated by the destination digital wallet system that received the first amount from the source digital wallet system. The destination digital wallet system may request a transfer of a second amount of currency. The second amount of currency may be larger amount than the first amount received from the source digital wallet system.

The bridging protocol may be configured to validate the transactional integrity of the second request. The bridging protocol may classify an amount of currency as being included in the first or second amount using a first-in-first-out ("FIFO") currency management.

For example, User1 may send $10 to Recipient1. A digital wallet of User1 may operate using digital wallet system A. A digital wallet of Recipient1 may operate using digital wallet system B. User2 may send $20 to Receipient1. A digital wallet of User2 may operate using digital wallet system C. The bridging protocol may allow Recipient1 to receive both transfers despite each of User1, User2 and Recipient1 using different digital currency systems. In this case, the bridging protocol may ensure that Recipient1's digital wallet operating on digital wallet system B shows a total balance of $30.

The bridging protocol may assign a first unique identifier to the $10 transferred by User1 to Recipient1. The bridging protocol may assign a second unique identifier to the $20 transferred by User2 to Recipient1.

Recipient1 may then initiate a transfer of currency to Recipient2. A digital wallet of Recipient2 may operate using digital wallet system D. Recipient1 may transfer $5 to Recipient2 out of the $30 balance. The bridging protocol may use FIFO currency management to determine the unique identifier associated with the transfer from Recipient1 to Recipient2.

For example, using FIFO, the bridging protocol may determine that the $10 Recipient1 received from User1 was "first in" to Recipient1's digital wallet. Therefore, when Recipient1 sends $5 to Recipient2, the bridging protocol may assume that the $5 is associated with the unique identifier assigned to the transfer originally received from User1.

Continuing with this example, the bridging protocol may register a balance for Recipient2 in digital wallet system D of $5. The bridging protocol may record Recipient2's balance (e.g., in a distributed ledger) as being associated with the same unique identifier assigned to the currency ($10) received by Recipient1 from User1.

Recipient1 may have a balance of $25 in digital wallet system B. Using a FIFO implementation, the bridging protocol may classify Recipient1's balance as including $5 from User1 and $20 from User2. Recipient1 may now request a transfer of $25 to Recipient3. The bridging protocol may treat the transfer to Recipient3 as including $5 having the unique identifier assigning to currency received from User1 and $20 having the unique identifier assigning to currency received from User2.

Methods for managing transfers of currency between multiple digital payment systems are provided. The multiple digital wallet systems may be incompatible with each other. Incompatibility may include a first digital wallet system that cannot receive or transfer funds directly to a second digital wallet system. Communication generated by the first digital wallet system may not be understood by the second digital wallet system. Communications generated by the second digital wallet system may not be understood by the first digital wallet system.

Methods may include transferring a first amount of currency from a source digital wallet system to a first destination digital wallet system. Methods may include assigning a unique identifier to the first amount of currency. The unique identifier may correspond to a source of the first amount.

Methods may include receiving a request to transfer a second amount of currency from the first destination digital wallet system to a second destination digital wallet system. Methods may include validating the transactional integrity of the second amount. Validating may include generating a mapping of movement of the first amount among the multiple digital wallet systems. Using the example provided above, the mapping may include a flow of currency from User1→Recipient1→Recipient2. Using the example provided above, the mapping may include a flow of currency from User2→Recipient1→Recipient3.

Methods may include determining whether the validating yields a transactional integrity that is above or below a threshold level. The threshold level may be determined based on indicators developed when assessing transfers of currency between conventional bank accounts. The threshold level may be determined based on location of the transferee, location of the transferor, attributes of prior transfers associated with the unique identifier assigned to currency included in currency transfer.

Methods may include identifying repeating transfer patterns in the mapping. Repeating transfer patterns may indicate that a particular digital wallet or digital wallet system has participated in a threshold number of transactions involving the same currency. The threshold number of transactions may correspond to a disproportionate number of transactions associated with a target digital wallet or digital wallet system compared to the number of currency transfers processed by the bridging protocol on behalf of other digital wallets or digital wallet systems.

Repeating transfer patterns may indicate that currency is disproportionately flowing into or out of a particular digital wallet or digital wallet system. Based on attributes associated with a digital wallet or digital wallet system, the repeating transfer patterns may indicate that currency is disproportionately flowing into or out of a particular geographic region.

When the mapping includes less than a threshold number of repeating transfer patterns, the transactional integrity register as being above a threshold level. When the transaction integrity is above the threshold level, methods may include transferring the second amount to the second destination digital wallet system. When the threshold integrity is below the threshold level, methods may include imposing a time delay on the transferring of the second amount to the second destination digital wallet system. The time delay may be minutes, hours, days, months or any suitable duration of time.

The time delay may provide additional time to investigate the currency transfer before transferring the currency out of a digital holding account to a destination digital wallet.

Methods may include attempting to conduct additional analysis of the mapping during the time delay. If the additional analysis raises the transactional integrity above the threshold, the bridging protocol may execute the transfer request. If the additional analysis does not raise the transactional integrity above the threshold prior to expiration of the time delay, the transfer request may time-out.

After a transfer request times-out, the transferor may be required to submit a new transfer request. In some embodiments, the bridging protocol may determine that currency is available that would generate a transaction integrity above the threshold level. The bridging protocol may substitute the currency (or amount of the currency) that is needed to complete the transfer request with other currency having a transaction integrity above the threshold level. For example, using FIFO, the bridging protocol attempt to use currency that was provided to the transferor immediately prior the currency associated with the transactional integrity below the threshold level.

The bridging protocol may reject currency associated with a specific unique identifier that is associated with a transactional integrity below the threshold level. When currency is rejected, the bridging protocol may reject any future transfer requests that include the rejected currency.

Methods may include informing each digital payment system of the time delay. Methods may include informing each digital payment system of rejected currency. Method may circulate a message to each digital payment system using a gossip bridging protocol.

A system for integrating multiple digital currency systems is provided. The system may include a digital wallet. The digital wallet may be a hardware digital wallet ("HDW"). A HDW may include a wireless communication circuit. The wireless communication circuit may provide near field communication ("NFC") functionality for transmitting credentials stored locally on the hardware wallet. NFC transmissions may have a limited range of about 10 centimeters. Transmitted credentials may be used to pay for purchases or initiate other transactions.

The HDW may also include a wireless communication circuit for transmitting information over larger distances. For example, the HDW may include a wireless communication for transmitting and receiving credentials 10 meters, 90 meters, 0.5 kilometers, 40 kilometers or more. The wireless communication circuit may provide functionality for accessing a network using Bluetooth communications, WiFi communications or cellular communications. The wireless communication circuit may utilize credentials stored on a subscribe identification module ("SIM") card to access a network.

The HDW may interact with digital wallets of other digital wallet systems by accessing a bridging protocol. The bridging protocol may provide an interface for interacting with multiple, and possibly incompatible, digital currency systems. The HDW may be configured to access the bridging protocol over a network using the wireless communication circuit. For example, the HDW may access a network using NFC, cellular communication or any other suitable network or communication method.

In some embodiments, the HDW may function as a replacement for a missing payment instrument. For example, a HDW may be provided to user to replace a lost credit card, debit card or smartphone. The HDW may be provided to users at local bank branches.

Currency may be associated with the HDW via a currency transfer from any suitable digital wallet system or bank. For example, a user's family or friends may initiate a currency transfer to the HDW using any suitable digital wallet system accessible to the family and or friends. Because the HDW is capable of accessing the bridging protocol, it will be able to accept a currency transfer from any digital wallet system. The user does not need to have an account at any particular bank to receive currency from family or friends.

In some embodiments, currency from the user's own bank accounts may be associated with the HDW. For example, the bridging protocol may receive a currency transfer request from the user's bank via Fedwire, CHIPS, of SWIFT and associate received currency with the HDW.

Associating currency with the HDW may include storing the currency received (from a digital wallet system or bank)

in a digital holding account. The digital holding account may be linked to the HDW using a unique identifier of the HDW.

For example, the wireless communication circuit may have a unique media access control ("MAC") address. The HDW may be activated at a local bank branch. The activation process may include using the MAC address as a unique identifier of the HDW. The MAC address may associate a HDW with a digital holding account. The activation process may also include associating information stored on the SIM card embedded in the HDW with the digital holding account.

The activation process may include storing a token on the HDW. The token may be encrypted. The token may be stored in a secure chipset on the HDW. The secure chipset may be isolated such that it has limited interaction with the HDW's operating system. For example, information stored on the secure chipset may only be accessible when the HDW is within a NFC communication range of a merchant POS terminal. The secure chipset may only be accessed by the merchant POS terminal and not directly by the operating system running on the HDW.

The token stored on the secure chipset may correspond to conventional payment instrument information. Conventional payment instrument information may include:

Brand (i.e., issuer, transaction network, acquirer)
Customer name
Expiration date
Payment instrument security code ("CSC")
Payment instrument verification data ("CVD")
Payment instrument verification value ("CVV," "CVV2," "iCVV" or "Dynamic CVV")
Payment instrument verification value code ("CWC")
Payment instrument verification code ("CVC" or "CVC2")
Verification code ("V-code")
Payment instrument code verification ("CCV")
Signature panel code ("SPC")
Customer identification number ("CID")
Payment instrument account number
Affinity Product (i.e., rewards card, platinum card, signature card, ect.)

The conventional payment instrument information may also be associated with the digital holding account. The HDW may provide the token to a merchant POS terminal (e.g., via NFC) to initiate a purchase or other transaction using the conventional payment information. The token may provide credentials that authorize the HDW to interact with a merchant POS terminal and initiate transactions based on currency stored in the digital holding account. The merchant POS terminal may process the transaction using conventional transaction processing networks. Illustrative conventional transaction processing networks may include networks provided by Visa, Inc. of Foster City, Calif., MasterCard, Inc. of Purchase, N.Y., or American Express Company of New York, N.Y.

The HDW may include a biometric reader. The biometric reader may be configured to capture any suitable biometric feature. Illustrative biometric features may include finger prints, retina scans or facial scans. During an activation process, a user may be prompted to store a biometric feature on the HDW. The biometric feature may be stored on the secure chipset. The stored biometric feature may be used to authorize transactions. The stored biometric feature may be used to authorize release of credentials shored locally on the HDW.

For example, when a purchase is initiated by the HDW at a merchant POS terminal, the user may be prompted to provide a biometric feature. The user may provide the biometric feature via the merchant POS terminal. The user may provide the biometric feature using the biometric reader of the HDW. The HDW may authenticate the captured biometric feature by comparing it with the biometric feature stored locally on the HDW. If the stored biometric feature matches the provided biometric feature, the initiated transaction may be allowed to proceed.

The HDW may interact with the merchant POS terminal using NFC communication protocols. Using the NFC communication, the digital hardware wallet may identify a digital wallet system compatible with the merchant POS terminal. Using a cellular network accessible via credential stored on the SIM card, the HDW may access the bridging protocol and request that the bridging protocol formulate a currency transfer request that is formatted for the compatible digital wallet system in use by the merchant POS terminal. Upon receiving the currency transfer request from the bridging protocol, the HDW may submit the transaction details to the merchant POS terminal via NFC communication.

A system for bridging technological gaps between digital transaction processing systems is provided. The system may include a digital holding account. The system may include a HDW. The HDW may include two or more client digital wallet applications. Each client digital wallet application may be configured to provide credentials for accessing the digital holding account via a target digital wallet system. A client digital wallet application may utilize near field communication capabilities of the HDW to transmit credentials stored on the HDW to a merchant POS terminal.

The system may include a bridging protocol. The bridging protocol may be configured to receive a transfer request from a source digital wallet system. The source digital wallet system may be operationally incompatible with the target digital wallet system. The transfer request may initiate a transfer of currency to the HDW. The bridging protocol may transfer the currency to the digital holding account. The bridging protocol may validate a transactional integrity of the currency.

When the transactional integrity is above a threshold, the bridging protocol may provide access to the currency via the multiple client digital wallet applications on the HDW. When the transactional integrity is below the threshold, the bridging protocol may reject the transfer request. The bridging protocol may also be configured to disseminate the rejection to multiple digital currency systems.

The bridging protocol may be configured to generate multiple virtual digital wallet interfaces. Each interface generated by the bridging protocol may control secure access to the digital holding account by a different source digital wallet system. The bridging protocol may be configured to generate a universal digital wallet interface. The universal digital wallet interface may securely provide access to the digital holding account from any one of the multiple source digital wallet systems.

The HDW may be configured to provide a first identifier for accessing the target digital wallet system. The HDW may be configured to provide a second identifier for accessing the source digital wallet system. The first identifier may be a payment instrument account number. An illustrative payment instrument account number may be a 16 digit number. The second identifier may be the MAC address.

The bridging protocol may receive a transfer request from the HDW to transfer currency to a destination digital wallet. The bridging protocol may locate a destination account corresponding to the destination digital wallet. The bridging protocol may debit the digital holding account and credit the destination account.

Methods for transferring currency among multiple, siloed digital payment systems are provided. Methods may include linking a digital holding account to a first digital wallet application running on a HDW. Methods may include linking the digital holding account to a second digital wallet application running on the HDW. Methods may include using the first digital wallet application, interacting with a source digital wallet system and initiating a transfer of currency from the source digital wallet system to the digital holding account.

Methods may include using the second digital wallet application, interacting with a merchant POS terminal and initiating a transfer of the currency from the digital holding account to a destination account. The source digital wallet system, the destination digital wallet system and the merchant POS terminal each operate using incompatible data formats.

The destination account may be a first destination account. The methods may include using the second digital wallet application, initiating a transfer of a first amount of the currency from the digital holding account to the first destination account. The first destination account may be identified by an email address or phone number. Methods may include using the second digital wallet application, initiating a transfer of a second amount of the currency from the digital holding account to a second destination account. A first digital wallet system may transfers the first amount and a second digital wallet system may transfer the second amount.

Methods may include evaluating a transactional integrity of currency received from the source digital wallet system by mapping a flow the currency among each of the siloed digital payment systems. When the mapping includes less than a threshold number of repeating transfer patterns, methods may include adding the currency to a balance available to the second digital wallet application. When the transactional integrity includes the threshold number of repeating patterns, methods may include quarantining the currency in the digital holding account.

Methods of may include activating a first authentication scheme on the HDW to access the first digital wallet application. Methods of may include activating a second authentication scheme on the HDW to access the second digital wallet application. The first digital wallet application may use a MAC address of a wireless communication circuit of the hardware digital wallet to access the digital holding account. The second digital wallet application may use a 16 digit number to access the digital holding account.

Methods may include using NFC to transmit information between the HDW and the merchant POS terminal. Methods may include using a cellular network to transmit communications between the HDW and the source digital wallet system.

Apparatus for a payment instrument is provided. The payment instrument may include a housing. The payment instrument may include a non-transitory memory storing a token. The payment instrument may include a wireless communication circuit having a MAC address. The payment instrument may include a microchip having one or more integrated circuits for running a payment processing application. The microchip may include an integrated circuit that provides the functionality of a microprocessor. The microchip may be embedded in the housing.

The payment instrument may include a first payment processing application stored on the non-transitory memory. The first application may be configured to control release of the token to a first transaction processing network. Providing the token may authorize a first transaction. The payment instrument may include a second payment processing application stored on the on the non-transitory memory. The second application may be configured to control release of the MAC address to a second transaction processing network to authorize a second transaction.

The first payment processing application may be configured to communicate with a merchant POS terminal using near field communication. The second payment processing application is configured to communicate with a bridging protocol using a cellular communication network.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes digital wallet systems 101. Digital wallet systems 101 may each be incompatible with each other. For example, digital payment wallet system$_1$ may be unable to transfer currency to digital wallet system$_2$. Digital wallet system$_2$ may be unable to receive currency from digital wallet system$_3$.

System 100 includes bridging protocol 103. Bridging protocol 103 may receive transfer requests generated by one or more of digital wallet systems 101. The transfer requests may be received from a digital wallet application that interfaces with a particular digital wallet system. A digital wallet application may be run on a mobile device of an end user the particular digital wallet system.

In response to receiving a transfer request from digital wallet systems 101, bridging protocol 103 may utilize conversion engine 105. Conversion engine 105 may convert a transfer request into a format that may be processed by bridging protocol 103. Conversion engine 105 may convert a transfer request received from one of digital wallet systems 101 into a format that may be processed by different one of digital wallet systems 101.

Conversion engine 105 may be configured to forward currency to digital holding account 107. Digital holding account 107 may hold currency received from one or more of digital wallet systems 101. Digital holding account 107 may hold the currency while a transactional integrity of the currency is being evaluated by bridging protocol 103.

When a transactional integrity associated with currency is above a threshold level, the currency may be accessible by hardware digital wallet 111. Hardware digital wallet 111 may be controlled by one or more digital wallet applications. The digital wallet applications may be stored on hardware digital wallet 111. Hardware digital wallet 111 may include NFC functionality. Hardware digital wallet 111 may receive or initiate transfers of currency via NFC communication.

Hardware digital wallet 111 may communicate with merchant POS terminal ("MPOST") 113. Hardware digital wallet 111 may use NFC to communicate with MPOST 113. Hardware digital wallet 111 may provide credentials for accessing currency stored in digital holding account 107 to MPOST 113. MPOST 113 may be configured to initiate a transaction based on credentials provided by hardware digital wallet 111. FIG. 1 shows that MPOST 113 may submit the credentials to transaction processing networks 109.

Transaction processing networks 109 may link acquirers, issuers and other transaction participants that process transactions. For example, transaction processing networks 109 may receive an authorization decision from an issuer and transmit the authorization decision to MPOST 113. In response to receiving a granted authorization decision, MPOST 113 may release a desired product to the user of hardware digital wallet 111. In response to receiving a denial authorization decision, MPOST 113 may prompt the user to provide an alternative payment method (e.g., cash or check).

Transaction processing networks 109 (in communication with other transaction participants) may settle transactions between the issuer and the acquirer, digital payment applications or any parties to a transaction. A transaction settlement process may include a transfer of funds between two or more transaction participants. A settlement network may transfer the funds between transaction participants. Illustrative settlement networks may include Fedwire or other suitable settlement networks. The settlement network may include any network linking one or more accounts of transaction participants.

System 100 shows that transaction processing networks 109 may transfer funds into digital holding account 107. Funds transferred into digital holding account 107 may be assigned a unique identifier by bridging protocol 103. In some scenarios, funds received by bridging protocol 103 may already be associated with a unique identifier previously assigned by bridging protocol 103.

Figure 2:
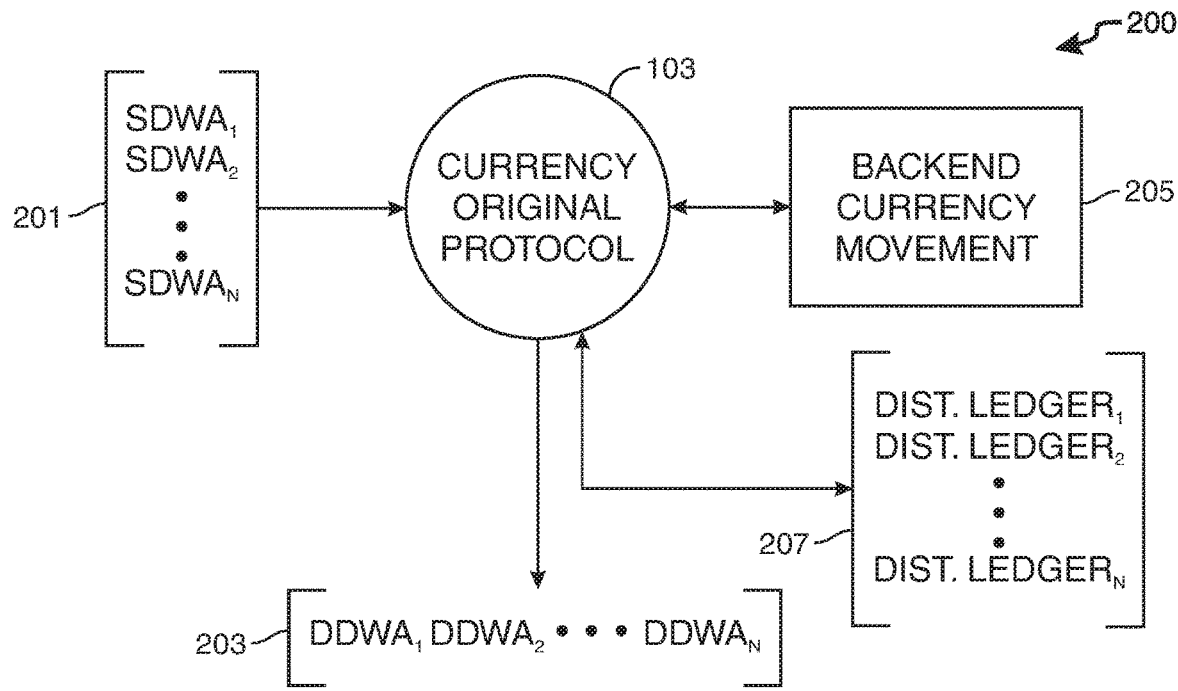
FIG. 2 shows an illustrative system in accordance with principles of the disclosure.

FIG. 2 shows illustrative system 200. System 200 includes source digital wallet applications ("SDWA") 201. Each of SDWA 201 may be an end-user application for interfacing with at least one of digital wallet systems 101. A user of SDWA 201 may submit a request for transferring currency to one or more of destination digital wallet applications ("DDWA") 203. Each of DDWA 203 may be end-user application compatible with at least one of digital wallet systems 101.

In response to receiving a transfer request from SDWA 201, bridging protocol 103 may evaluate a transactional integrity of currency associated with the request. For example, bridging protocol 103 may map a flow of the currency. Bridging protocol 103 may generate the map using records stored in distributed ledgers 207. Distributed ledgers 207 may include records of transactions processed by bridging protocol 103. Distributed ledgers 207 may include ledgers maintained by one or more of digital wallet systems 101.

Bridging protocol 103 may generate the map using information stored in records associated with backend currency movement 205. Backend currency movement 205 may include records of transactions processed by MPOST 113 and transaction processing networks 109. Bridging protocol 103 may correlate records stored in distributed ledgers 207 with records associated with backend currency movement 205. The correlating may be performed based on common attributes included in each set of records.

For example, a unique identifier assigned to currency stored in a record on distributed ledgers 207 may identify a source name associated with currency. The source name may correspond to a name on an account stored in records generated by MPOST 113 and transaction processing networks 109 and stored in records associated with backend currency movement 205.

Bridging protocol 103 may bridge incompatibility between SDWA 201 and DDWA 203. Bridging protocol 103 may transfer currency from SDWA 201 to DDWA 203. Bridging protocol 103 may only transfer currency from SDWA 201 to DDWA 203 when validation of a transactional integrity is above a threshold level.

Figure 3:
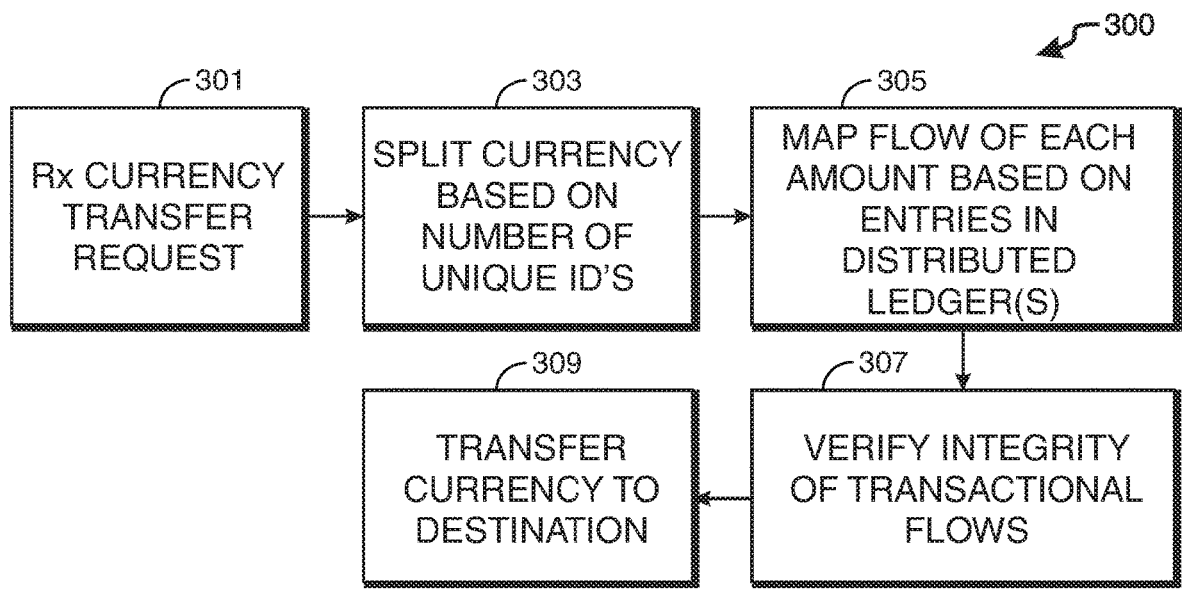
FIG. 3 shows an illustrative process in accordance with principles of the disclosure.

FIG. 3 shows illustrative process 300. One or more of the steps of the process illustrated in FIG. 3 may be performed by a "system." The "system" may include one or more of the features of the apparatus shown in FIGS. 1-2 and/or any other suitable device or approach. The "system" may be provided by an entity. The entity may be an individual, an organization or any other suitable entity.

Process 300 begins at step 301. At step 301 the system receives a currency transfer request. The request may be received from a source digital wallet application asking to transfer an amount of currency to a destination digital wallet application. At step 303, the system splits currency based on the number of unique identifiers associated with the currency associated with the transfer request.

For example, a source digital wallet application may request that an amount of currency be transferred to a destination digital wallet application. The requested amount of currency may include currency received by the source digital wallet application from multiple other sources. Each amount of currency received from the other sources may be assigned a different unique identifier.

At step 305, the system maps a flow of each amount of the currency that is assigned a different unique identifier. The flows may be mapped based on entries in one or more distributed ledger(s). At step 307, the system verifies integrity of currency flows. Verifying the integrity may include determining an origin of each amount of currency included in the transfer request. Verifying the integrity may include determining that security of a source digital wallet application associated with the origin has not been compromised. Verifying the integrity may include determining that security of a destination digital wallets application has not been compromised.

At step 309, when the transactional integrity is above a threshold level, the system transfers currency to destination digital wallet application. The transfer to the destination digital wallet application may include formulating communications that are compatible with the digital wallet system of the destination digital wallet application identified in the transfer request at step 301.

Figure 4:
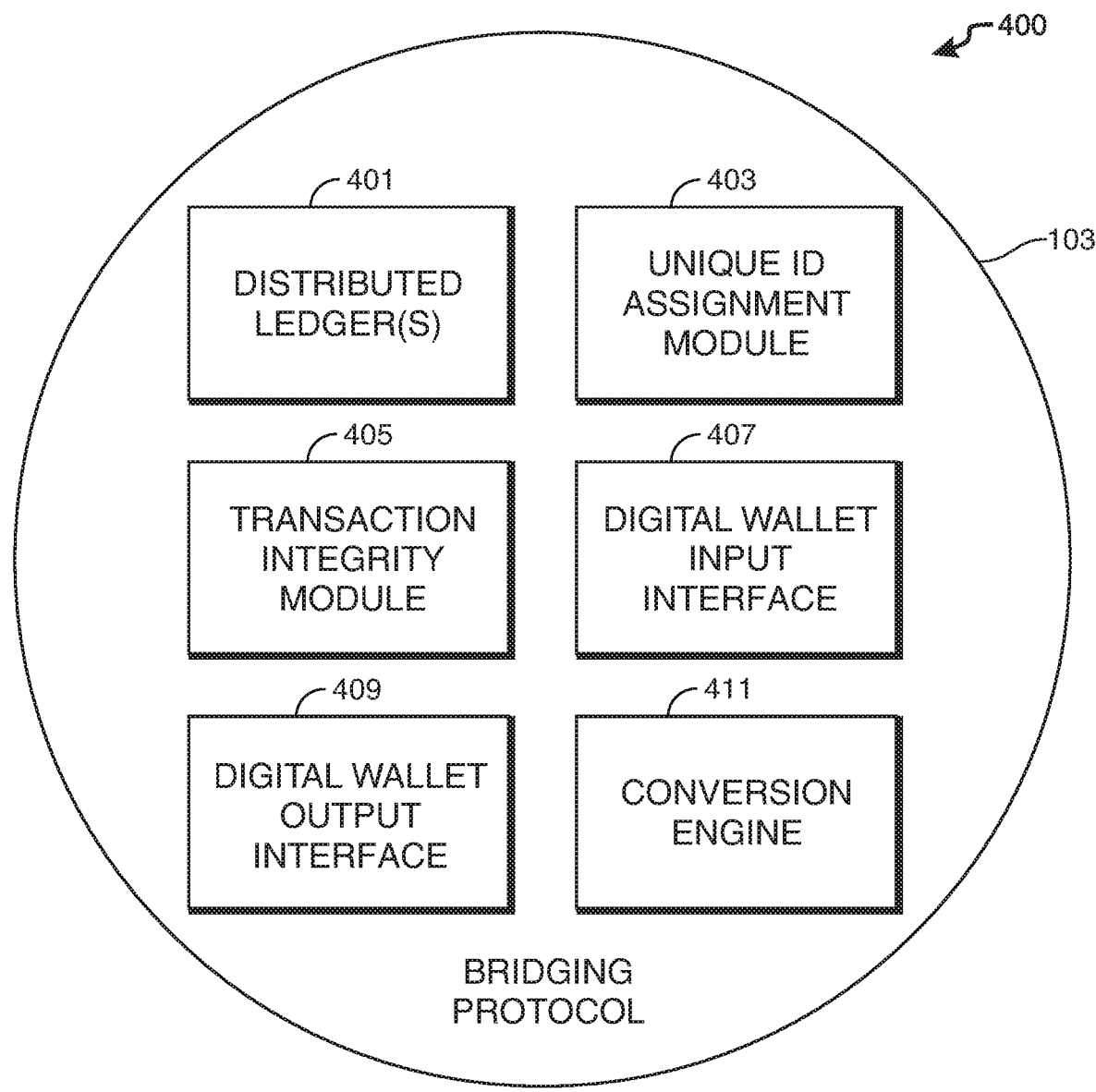
FIG. 4 shows illustrative system components in accordance with principles of the disclosure.

FIG. 4 shows illustrative system 400. System 400 shows sub-components of bridging protocol 103. System 400 includes distributed ledger(s) 401. Distributed ledger(s) 401 may be used by bridging protocol 103 to store records of each transfer processed by bridging protocol 103. Distributed ledger(s) 401 may be used by digital wallet systems 101 to store transactions processed by those systems. Each transaction processed by digital wallet systems 101 may include a unique identifier assigned to currency by bridging protocol 103.

System 400 includes unique ID assignment module 403. Assignment module 403 may determine whether a currency amount identified in transfer request received by bridging protocol 103 has already been assigned a unique identifier. Assignment module 403 may split a currency into amounts. For example, assignment module 403 may use FIFO to assign a unique identifier to currency amounts associated with a transfer request. Any suitable accounting method may be used to assign a unique identifier to currency in a transfer request. Other suitable accounting methods may include last-in-first-out ("LIFO") currency management.

System 400 includes transaction integrity module 405. Transaction integrity module 405 may generate maps showing movement of currency through one or more of digital wallet systems 101. Transaction integrity module 405 may generate maps showing movement of currency between different digital wallet systems 101.

Transaction integrity module 405 may generate heat maps based on one or more unique identifiers assigned to currency in a transfer request. The heat maps may show digital wallet applications (source or destinations) that have been in involved in transactions that include the currency assigned the unique identifiers associated with currency identified the currency transfer request. The heat maps may show that relatively large amounts of the currency have been received by particular source or destination digital wallet systems or applications. Such digital wallet systems and applications may be flagged for suspicious activity.

Heat maps generated by transaction integrity module 405 may be compared to heat maps or other transaction information for an entity or individual user. Other transaction information may include transaction records generated by back end currency movement 205 (shown in FIG. 2) or transaction processing network 109 (shown in FIG. 1). If the heat maps generated by transaction integrity module 405 show transaction activity that is disproportionate to the transaction information associated with others sources, the transactional integrity may be classified as being below a threshold level.

System 400 includes conversion engine 411. Conversion engine 400 may include one or more features of conversion engine 105 (shown in FIG. 1). System 400 includes digital wallet input interface 407. Interface 407 may be used to receive transfer requests from SDWA 201 (shown in FIG. 2). System 400 may include an interface 400 for communicating with each of SDWA 201. Interface 407 may transfer currency from SDWA 201 to digital holding account 107.

System 400 includes digital wallet output interface 409. Interface 409 may be used to initiate transfer requests with DDWA 203 (shown in FIG. 2). System 400 may include an interface 409 for communicating with each of DDWA 203. Interface 409 may transfer currency from digital holding account 107 to DDWA 203.

Figure 5:
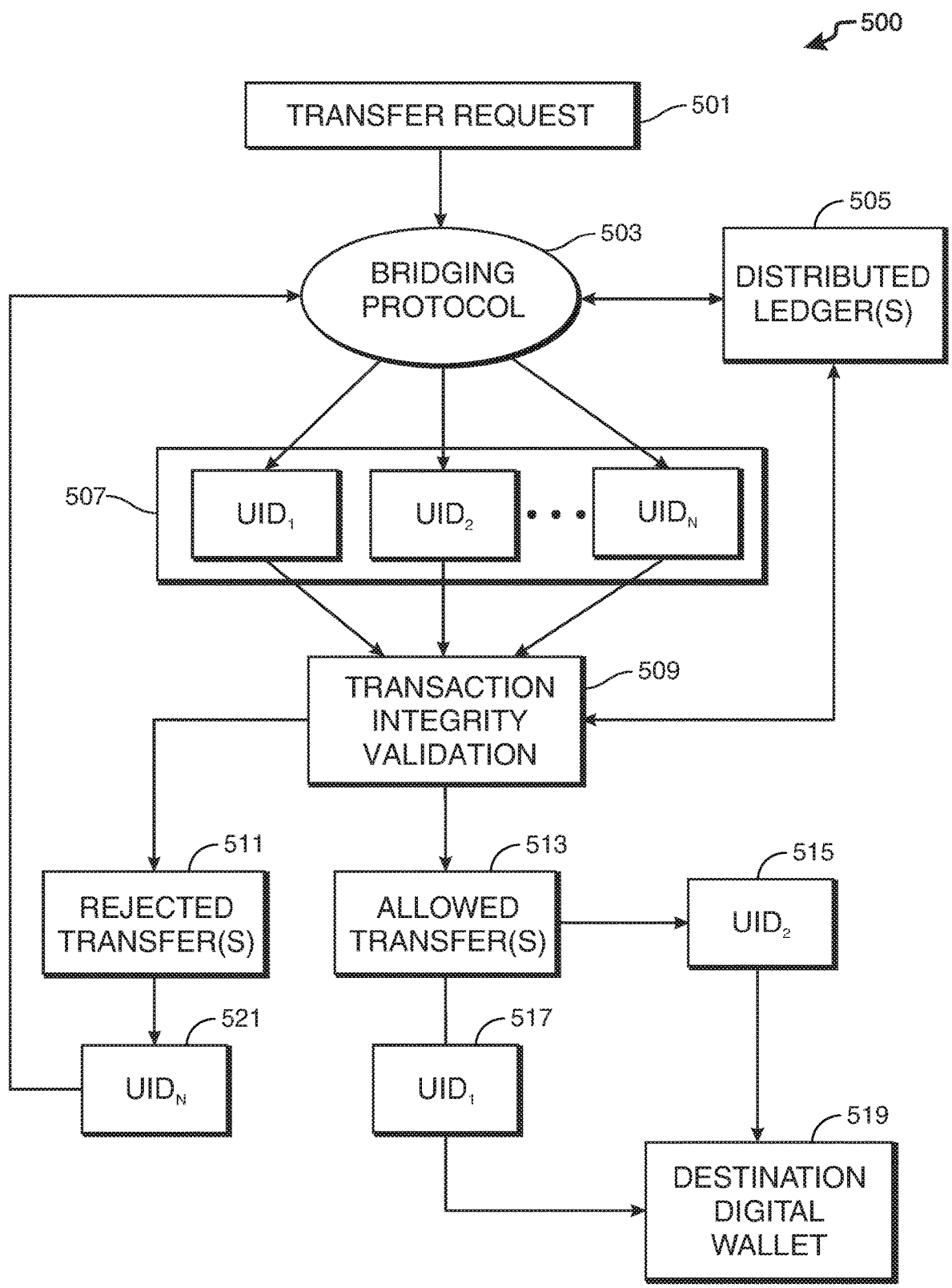
FIG. 5 shows an illustrative process in accordance with principles of the disclosure.

FIG. 5 shows illustrative process 500. One or more of the steps of the process illustrated in FIG. 5 may be performed by a "system." The "system" may include one or more of the features of the apparatus or processes shown in FIGS. 1-4 and/or any other suitable device or approach. The "system" may be provided by an entity. The entity may be an individual, an organization or any other suitable entity.

Process 500 begins at step 501. At step 501 the system receives a transfer request. At step 503 the transfer request is ingested by bridging protocol 503. At step 505 bridging protocol communicates with distributed ledgers 505. Distributed ledgers 505 record prior and current transactions processed by bridging protocol 503. Transfer request 501 may include currency that already has been assigned a unique identifier by bridging protocol 503.

Bridging protocol 503 may apply an appropriate accounting method (e.g. FIFO, LIFO) to track unique identifiers 507 associated with currency referenced in transfer request 501. At step 509, the system may perform transaction integrity validation 509. Transaction integrity validation 509 may be performed for each of unique identifiers 507. Transaction integrity validation 509 may include generating a map of currency flow for each of unique identifiers 507. Transaction integrity validation 509 may include analysis of the currency flow maps.

Analysis of the currency flow maps may identify unusual patterns or other anomalous activity associated with unique identifiers 507. At step 511, the system rejects the transfer of currency associated with unique identifiers 521. Currency assigned unique identifiers 521 may have transactional integrity below a threshold level. For example, analysis of the currency flow maps for unique identifiers 521 may show anomalous or suspicion flow patterns.

At step 513, the system allows the transfer of currency associated with unique identifiers 517 and 515 to destination digital wallet 519. Currency assigned unique identifiers 517 and 515 may each have a transaction integrity above a threshold level. For example, analysis of the currency flow maps for unique identifiers 517 and 515 may show random flow patterns without a threshold number of repeating patterns.

Figure 6:
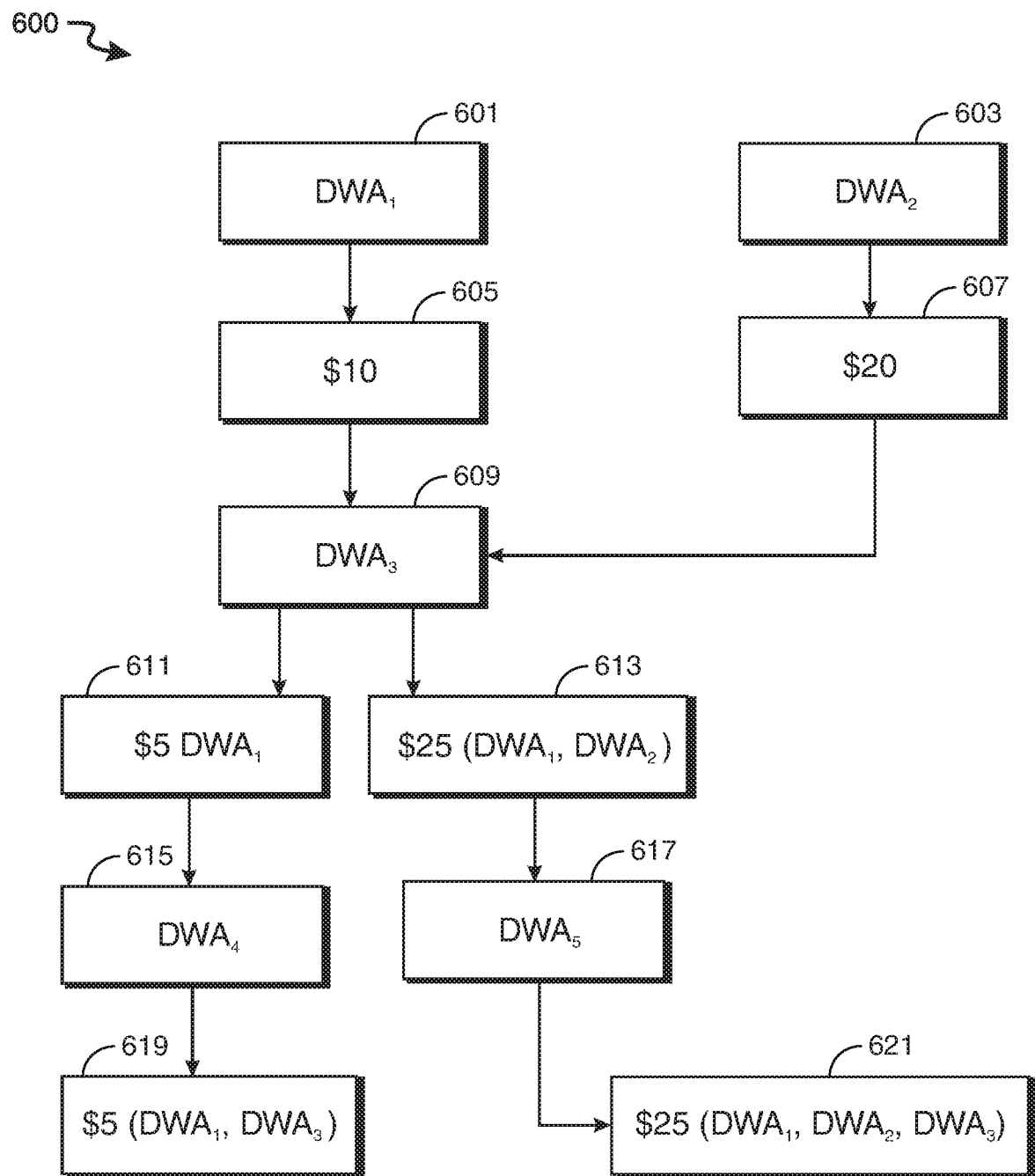
FIG. 6 shows an illustrative process in accordance with principles of the disclosure.

FIG. 6 shows illustrative currency movement 600. A bridging protocol such as protocols 103 and 503, may implement currency movement 600. Movement 600 shows that destination digital wallet$_1$ ("DDWA$_1$") 601 initiates a transfer of $10 (item 605) to DDWA$_3$ (item 605). Movement 600 also shows that at step 603, DDWA$_2$ initiates a transfer of $20 (item 607) to DDWA$_3$.

At step 609, after transfers 605 and 607, DDWA$_3$ is associated with a total balance of $30. At step 611, DDWA$_3$ requests a transfer of $5 to DDWA$_4$ (item 615). Step 611 also shows that the $5 selected for transfer to DDWA$_4$ is currency DDWA$_3$ received from DDWA$_1$. At step 613, DDWA$_3$ requests a transfer of $25 to DDWA$_5$ (item 617). Step 613 also shows that the $25 selected for transfer to DDWA$_4$ is currency DDWA$_3$ received from DDWA$_1$ and DDWA$_2$.

Step 621 shows that after DDWA$_5$ receives the $25 from DDWA$_3$, the $25 is associated with prior transactions that trace the origin of the currency back to DDWA$_1$, DDWA$_2$ and DDWA$_3$. Step 619 shows that after DDWA$_4$ receives the $5 from DDWA$_3$, the $5 is associated with prior transactions that trace the origin of the currency back to DDWA$_1$ via DDWA$_3$.

FIGS. 7A and 7B show illustrative transaction records that may be generated by currency movement 600 shown in FIG. 6. The transaction records may be stored in a distributed leger such as distributed ledgers 207, 401 or 505. Record 701 includes attributes evidencing the transfer of $10 from DDWA$_1$ to DDWA$_3$. Record 703 includes attributes evidencing the transfer of $20 from DDWA$_2$ to DDWA$_3$. Record 706 includes attributes evidencing the transfer of $5 from DDWA$_3$ to DDWA$_4$. Records 707 and 709 include attributes evidencing the transfer of $25 from DDWA$_3$ to DDWA$_5$.

Figure 8:
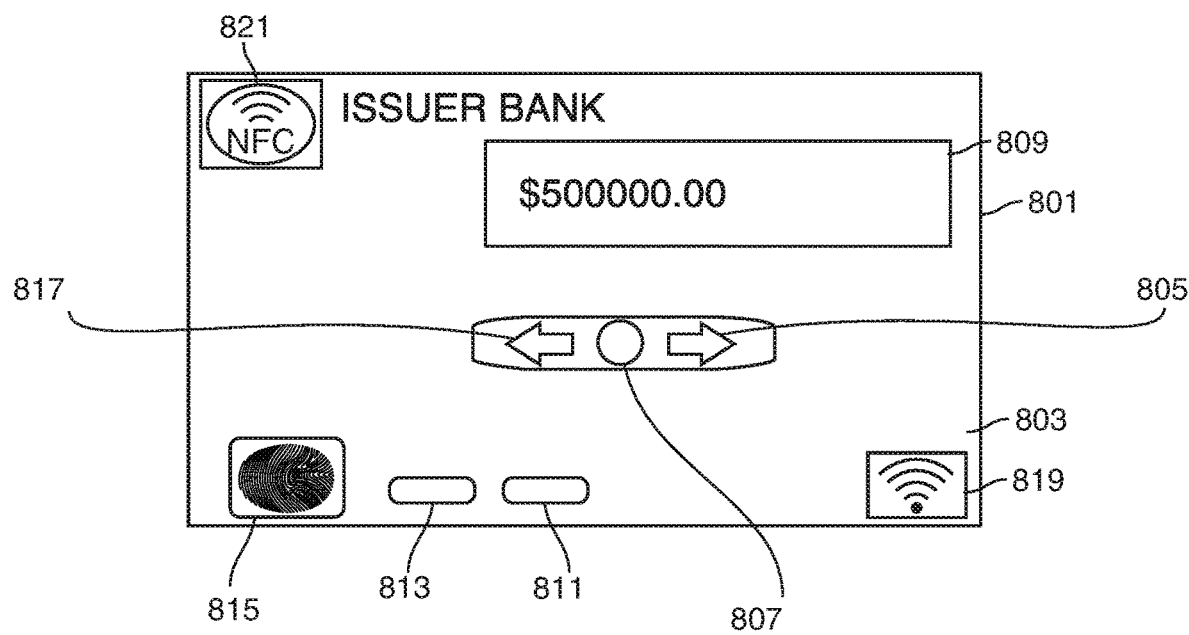
FIG. 8 shows illustrative apparatus in accordance with principles of the disclosure.

FIG. 8 shows illustrative front face 803 of HDW 801. Front face 803 includes display 809. Display 809 may present a current balance stored in a digital holding account (and associated with HDW 801) when button 813 is pressed. Button 811 may be depressed to show a balance held in the digital holding account is a different currency.

Buttons 805, 807 and 817 may be used to manually select a digital wallet application. A user may select any one of a plurality of digital wallet applications to be used for a transaction. Each digital wallet application may utilize a different digital wallet system and associated data/communication formats. A user may select a digital wallet application based on a digital wallet system used by a destination digital application. A user may select a digital wallet application based how a destination account is identified (e.g., email, address, phone number, name). HDW 801 may communicate with a bridging protocol to implement a transaction using the selected digital wallet application.

HDW 801 includes biometric reader 815. A current balance may only be presented on display 809 when a valid biometric feature is captured by biometric reader 815.

HDW 801 may receive a current balance during communication with a bridging protocol. In some embodiments, HDW 801 may access the bridging protocol using a data connection provided by a user's smart phone. In some embodiments, HDW 801 may include a wireless circuit for connecting to a data network via NFC 821 or WiFi 819.

Figure 9:
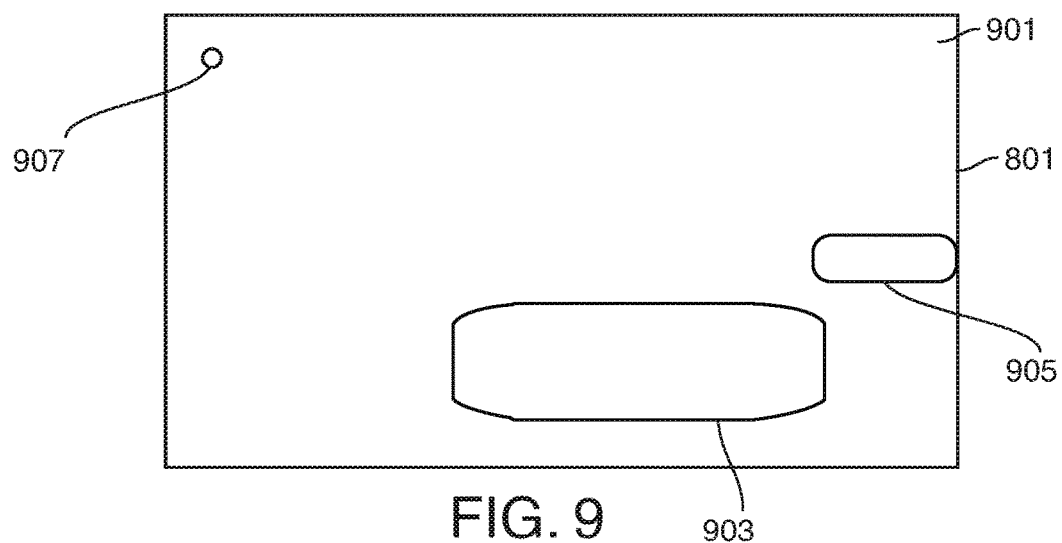
FIG. 9 shows illustrative apparatus in accordance with principles of the disclosure.

FIG. 9 shows back face 901 of HDW 801. Back face 901 includes factory reset button 907. Factory reset button 907 may be used to delete data (biometric features, token, ect.) stored locally on HDW 801. A biometric feature or other credential may be required to delete the locally stored data.

Back face 901 shows receptacle 905 for a SIM card. Back face 901 also includes receptacle 903 for batteries used to power HDW 801.

Figure 10:
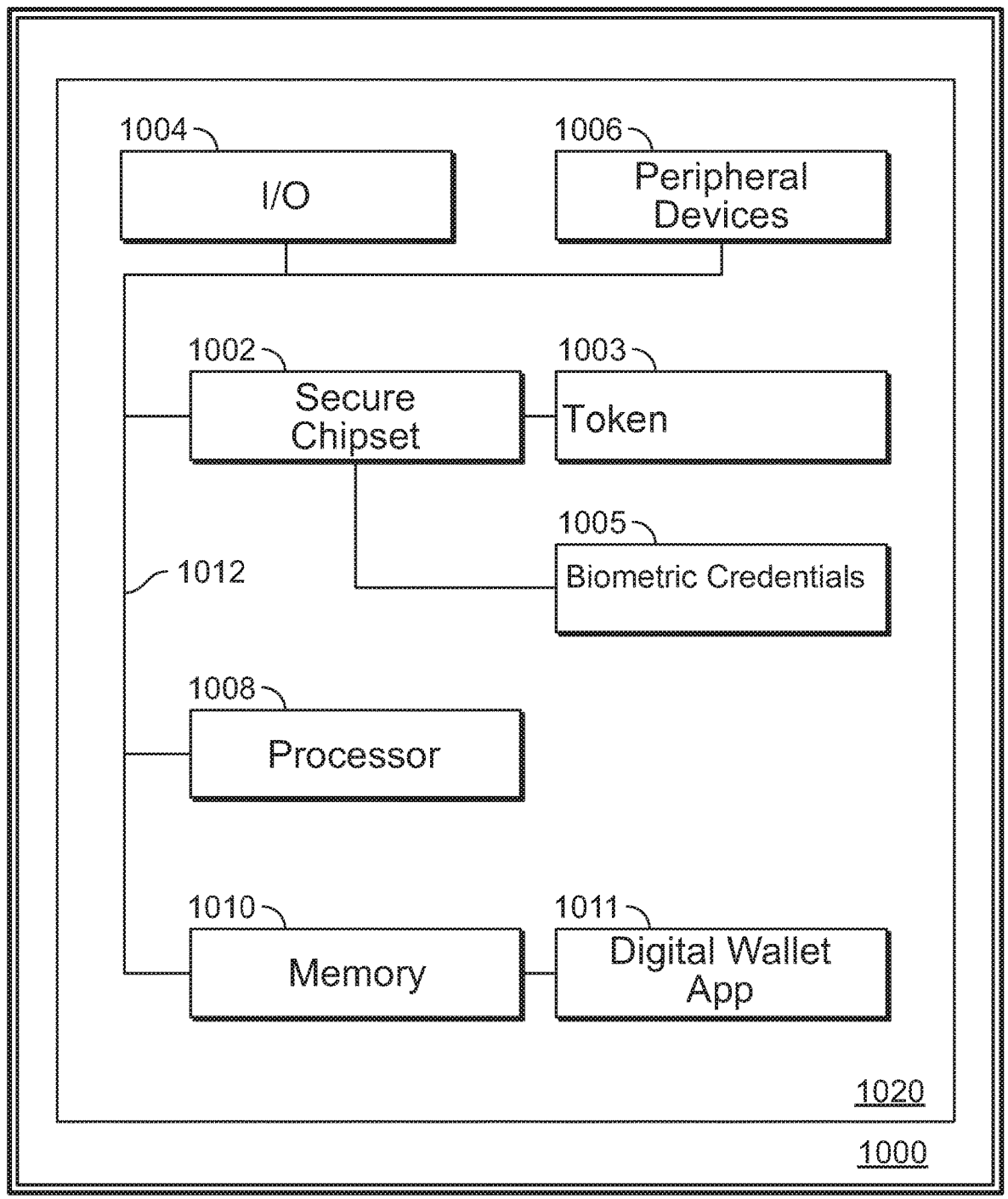
FIG. 10 shows illustrative apparatus in accordance with principles of the disclosure.

FIG. 10 shows illustrative hardware and digital information components 1000 that may be included in a hardware digital wallet such as HDW 801. Components 1000 may include one or more integrated circuits which may be configured to perform any suitable logical operation.

Components 1000 include secure chipset 1002. Secure chipset 1002 may be a microchip described herein. Secure chipset 1002 may be an isolated chip on a mobile device that has limited interaction with the rest of the mobile device's operating system.

For example, secure chipset 1002 may be "isolated" because it is only accessible when the mobile device is within communication range of a merchant POS terminal. Secure chipset 1002 may only be accessed by a merchant POS terminal and not by the operating system running on the mobile device. Secure chipset 1002 stores token 1003. Secure chipset 1002 stores biometric credentials 1005.

Token 1003 may be a series of randomly generated numbers that correspond to a set of credentials. The token may be transmitted from HDW 801 to a merchant POS terminal. The merchant POS terminal may forward the token to an issuer associated with token 1003. The issuer may hold a key needed to decipher the token and correlate the token to a specific account. The issuer may provide the merchant POS terminal with an authorization decision that approves or denies the purchase transaction. The token may be dynamically changed with each transaction so that a token is only usable for a single transaction.

Components 1000 include I/O circuitry 1004, which may include a transmitter device and a receiver device and may interface with fiber optic cable, coaxial cable, telephone lines, wireless devices, PHY layer hardware, a keypad/display control device or any other suitable encoded media or devices. The I/O module may include a microphone, button and/or touch screen which may accept user provided input. The I/O module may include one or more of a speaker for providing audio output and a video display for providing textual, audiovisual and/or graphical output. The video display may include one or more organic light emitting diodes.

I/O circuitry may include a wireless communication circuit. The wireless circuit may provide Wi-Fi, NFC, Bluetooth, satellite, cellular or any other suitable mode of wireless communication. Wi-Fi may include passive Wi-Fi with lower power consumption than typical Wi-Fi. Using the wireless circuit HDW may communicate wirelessly with a merchant POS terminal.

Hardware 1000 includes peripheral devices 1006, which may include counter timers, real-time timers, power-on reset generators or any other suitable peripheral devices. Hardware 1000 includes logical processor 1008, which may compute data structural information, structural parameters of the data, run an AI algorithm. Processor 1008 may include a microprocessor for controlling operation of HDW 801 and its associated components.

Processor 1008 may control communications HDW 801 and a merchant POS terminal or a bridging protocol. For example, when HDW 801 is within a communication range of a merchant POS terminal, processor 1008 may receive power from the merchant POS terminal via high frequency signals. POS terminal 111 may emit high frequency signals that provide power to components 1000. The high frequency signals may recharge a battery of HDW 801. High frequency signals may be signals that have a transmission range that is less than 50 centimeters ("cm"). Processor 1008 may issue commands to, or process commands received from, a merchant POS terminal.

Components 1000 include machine-readable memory 1010. Memory 1010 may store applications used by a mobile device, such as an operating system, application programs, web browser and a database. Application programs, which may be used by HDW 801, may include computer executable instructions for invoking user functionality related to communication, such as email, short message service ("SMS"), and voice input and speech recognition applications. Application programs may utilize one or more algorithms that control prompts presented at a merchant POS terminal, process received executable instructions, perform power management routines or other suitable tasks. Applications may include one or more digital wallet applications 1011.

Components 1000 may be coupled together by a system bus or other interconnections 1012 and may be present on one or more circuit boards such as circuit board 1020. In some embodiments, the components may be integrated into a single chip. The chip may be silicon-based.

Thus, apparatus and methods for a REUSABLE NEAR FIELD COMMUNICATION ("NFC") DEVICE FOR PRE-STAGE POINT-OF-SALE ("POS") PAYMENTS are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A payment instrument comprising:
   a housing;
   a non-transitory memory storing a token;
   a wireless communication circuit having a media access control ("MAC") address;
   a first payment processing application stored on the non-transitory memory and comprising computer executable instructions, that when executed by the payment instrument releases the token to a first transaction processing network to authorize a first transaction in conventional currency; and a second payment processing application stored on the on the non-transitory memory and comprising self-executing computer executable instructions, that when executed by the payment instrument:

locates cryptocurrency stored in a source digital wallet account by formulating first proprietary security requirements and first proprietary communications that are compatible with the source digital wallet account;

maps a flow of the cryptocurrency among a plurality of incompatible digital payment systems and determines whether the flow includes a target number of repeating transfer patterns;

when the flow includes less than a threshold number of the repeating transfer patterns:

formulates second proprietary security requirements and second proprietary communications that are compatible with a destination digital wallet account; and releases the MAC address to a second transaction processing network to authorize a second transaction, the second transaction comprising transferring the cryptocurrency from the source digital wallet account to the destination digital wallet account; and when the flow includes more than a threshold number of the repeating transfer patterns, does not release the MAC address to the second transaction processing network and thereby prevents transfer of the cryptocurrency from the source digital wallet account to the destination digital wallet account;

wherein the each of the incompatible digital payment systems utilize proprietary security requirements and proprietary communication protocols that are not understood by any other of the incompatible digital payment systems.

2. The payment instrument of claim 1:

the first payment processing application is further configured to transfer the token using near field communication; and the second payment processing application is configured to communicate the MAC address using a cellular communication network.

3. The payment instrument of claim 2 wherein the source digital wallet account is a first source digital wallet account, the second payment processing application:

transfers a first amount of the cryptocurrency from the first source digital wallet account to the destination digital wallet account; and transfers a second amount of the cryptocurrency from a second source digital wallet account to the destination digital wallet account.

4. The payment instrument of claim 3, wherein the first source digital wallet account and the second digital wallet account each operate using incompatible data formats.

5. The payment instrument of claim 3, wherein the second payment processing application:

evaluates the transactional integrity of the first amount of the cryptocurrency by mapping a first flow the first amount of the cryptocurrency among each of a plurality of incompatible digital payment systems and;

evaluates the transactional integrity of the second amount of the cryptocurrency by mapping a second flow of the second amount of the cryptocurrency among each of a plurality of incompatible digital payment systems.

6. The payment instrument of claim 1, wherein, when the transaction integrity is below the threshold level, the second payment processing application quarantines the cryptocurrency in a digital holding account.

* * * * *